United States Patent
Bayer, Jr. et al.

[11] Patent Number: 5,747,107
[45] Date of Patent: May 5, 1998

[54] METHOD OF APPLYING A HOT MELT COATING

[75] Inventors: Glen H. Bayer, Jr., Cottage Grove; Timothy J. O'Leary, St. Paul, both of Minn.

[73] Assignee: Minnesota Mining and Manufacturing Company, St. Paul, Minn.

[21] Appl. No.: 548,897

[22] Filed: Oct. 26, 1995

[51] Int. Cl.$^6$ .................................................. B05D 5/10
[52] U.S. Cl. .......................... 427/208.4; 427/208.8; 427/407.1; 427/420; 427/428
[58] Field of Search ........................... 427/172, 208.4, 427/208.8, 407.1, 420, 428

[56] References Cited

U.S. PATENT DOCUMENTS

| | | | |
|---|---|---|---|
| 2,916,398 | 12/1959 | Marvin | 117/68 |
| 2,964,422 | 12/1960 | Bergstedt et al. | 117/76 |
| 3,398,014 | 8/1968 | Turner | 117/111 |
| 3,496,012 | 2/1970 | Biorseth | 117/111 |
| 4,167,914 | 9/1979 | Mladota | 118/33 |
| 4,211,741 | 7/1980 | Ostoich | 246/173 |
| 4,426,344 | 1/1984 | Dinter et al. | 264/171 |
| 4,430,284 | 2/1984 | Rasmussen | 264/171 |
| 4,443,397 | 4/1984 | Hahn et al. | 264/171 |
| 4,465,015 | 8/1984 | Osta et al. | 118/222 |
| 4,669,965 | 6/1987 | Murakami | 425/133 |
| 4,772,195 | 9/1988 | Touchet | 425/131 |
| 4,871,593 | 10/1989 | McIntyre | 427/428 |
| 4,889,234 | 12/1989 | Sorensen et al. | 206/459 |
| 4,897,235 | 1/1990 | Rosenthal et al. | 264/134 |
| 4,985,284 | 1/1991 | Shibata et al. | 427/428 |
| 5,030,484 | 7/1991 | Chino et al. | 427/434 |
| 5,066,435 | 11/1991 | Lorenz et al. | 264/40 |
| 5,069,934 | 12/1991 | Chino et al. | 427/131 |
| 5,072,688 | 12/1991 | Chino et al. | 118/411 |
| 5,230,920 | 7/1993 | Seno et al. | 427/64 |
| 5,256,357 | 10/1993 | Hayward | 264/171 |

FOREIGN PATENT DOCUMENTS

| | | |
|---|---|---|
| 0 012 789 A1 | 9/1980 | European Pat. Off. |
| 0 031 301 A1 | 7/1981 | European Pat. Off. |
| 0 279 579 | 8/1988 | European Pat. Off. |
| 0 622 127 A1 | 11/1994 | European Pat. Off. |
| 1 359 975 | 12/1964 | France |
| 35 37 433.0 | 9/1986 | Germany |
| 4-27462 | 1/1992 | Japan |
| 1 190 324 | 5/1970 | United Kingdom |
| 2 078 140 | 1/1982 | United Kingdom |

OTHER PUBLICATIONS

International Search Report for PCT/US96/14950.

*Primary Examiner*—Bernard Pianalto

[57] ABSTRACT

A method of applying a coating of hot melt polymeric material from a die to a substrate. Hot melt polymeric material is extruded through the die onto the peripheral surface of a rotating application roller to provide a coating layer along that peripheral surface. A substrate is conveyed past the peripheral surface of the application roller at an application interface to cause transfer of the first coating layer to the substrate and shearing and thinning of the coating layer because the substrate is conveyed faster than the peripheral speed of the application roller. The velocity of the peripheral surface and spacing between the die and the application interface along are selected to provide a time interval of at least 0.12 second for movement of portions of the coating layer from the die to the application interface, thereby affording relaxation and molecular reorientation of the hot melt polymeric material after the extruding step to facilitate shearing of the first coating layer at the application interface without causing ribbing or breaking of the coating layer.

7 Claims, 1 Drawing Sheet

METHOD OF APPLYING A HOT MELT COATING

TECHNICAL FIELD

The present invention relates to methods for coating thin coats of polymeric materials on substrates.

BACKGROUND OF THE INVENTION

Thin coats of polymeric materials such as hot-melt adhesives and radiation curable adhesives have been applied to substrates, such as paper, by several different methods. Such polymeric materials have been applied in one or more layers from dies directly onto substrates passing the dies. Gravure coating has also been used. In gravure coating, an applicator roller receives the polymeric material from a die and transfers the coating material to a substrate. Engraved depressions, or cells, formed in the peripheral surface of the applicator roller, carry the coating material which is transferred to the substrate at an application interface between the applicator roller and the substrate. With either of these processes it may be difficult to apply very thin layers of certain polymeric coating materials. The die openings must be very narrow to apply thin layers, and impurities such as gels and other contaminants in the coating material can too easily occlude the die opening, causing unacceptable streaking and voids in the coating, and requiring cleaning of the die.

European Patent Application 0 031 301 A1 describes a method for applying materials fed from a die onto a substrate by dropping the materials from the die into a nip between the substrate and a chrome surfaced roller, and moving the substrate through that nip at a speed faster than the material is exiting from the die so that the coating materials exiting the die will be drawn into thin layers and coated on the substrate in layers that are much thinner than the layers of material exiting the die. Thus the opening in the die can have a width that is not easily occluded, and a thin layer of material can still be applied to the substrate. While this method may work for some materials, it presents problems when used to apply certain polymeric materials such as hot-melt adhesives and radiation curable adhesives, because molecular orientation and compression of such materials, caused when they are forced through the die can cause ribbing or breaking of the coating material exiting the die when it is drawn or stretched as it is coated onto the substrate.

SUMMARY OF THE INVENTION

The present invention provides a method of applying a coating of hot melt polymeric material from a die to a substrate which includes thinning the layer of material after it exits the die without causing ribbing or breaking of the coated layer.

The method according to the present invention comprises the steps of (1) providing a coating apparatus including an application roller having a cylindrical peripheral surface about an axis, means mounting the application roller for rotation about the axis, die means having a first elongate die outlet opening, and means for mounting the die means at a die position along the cylindrical periphery of the application roller with the die opening extending generally parallel to the axis of the application roller; (2) rotating the application roller about the axis to provide a first velocity for the periphery of the application roller and movement of the periphery of the application roller past the die opening; (3) extruding the hot melt polymeric material through the first die opening onto the peripheral surface of the rotating application roller to provide a first coating layer along the peripheral surface; and (4) conveying the substrate past the peripheral surface of the application roller at an application interface to cause transfer of the first coating layer to the substrate at the application interface. The substrate is conveyed at a velocity greater than the surface velocity of the application roller to shear and thereby reduce the thickness of the first coating layer on the substrate with respect to the thickness of the first coating layer on the peripheral surface of the application roller. The velocity of the peripheral surface and spacing between the die position and the application interface along that peripheral surface are selected to provide a time interval of at least 0.12 second (and preferably at least 0.25 second) for movement of portions of the first coating layer from the die position to the application interface, thereby affording some relaxation and molecular reorientation of the hot melt polymeric material after the extruding step to facilitate elongation of the first coating layer at the application interface without causing ribbing or breaking of the coating layer.

BRIEF DESCRIPTION OF THE DRAWING

The present invention will be further described with reference to the accompanying drawing wherein like reference numerals refer to like parts in the several views, and wherein.

DETAILED DESCRIPTION OF THE INVENTION

Figure 1:
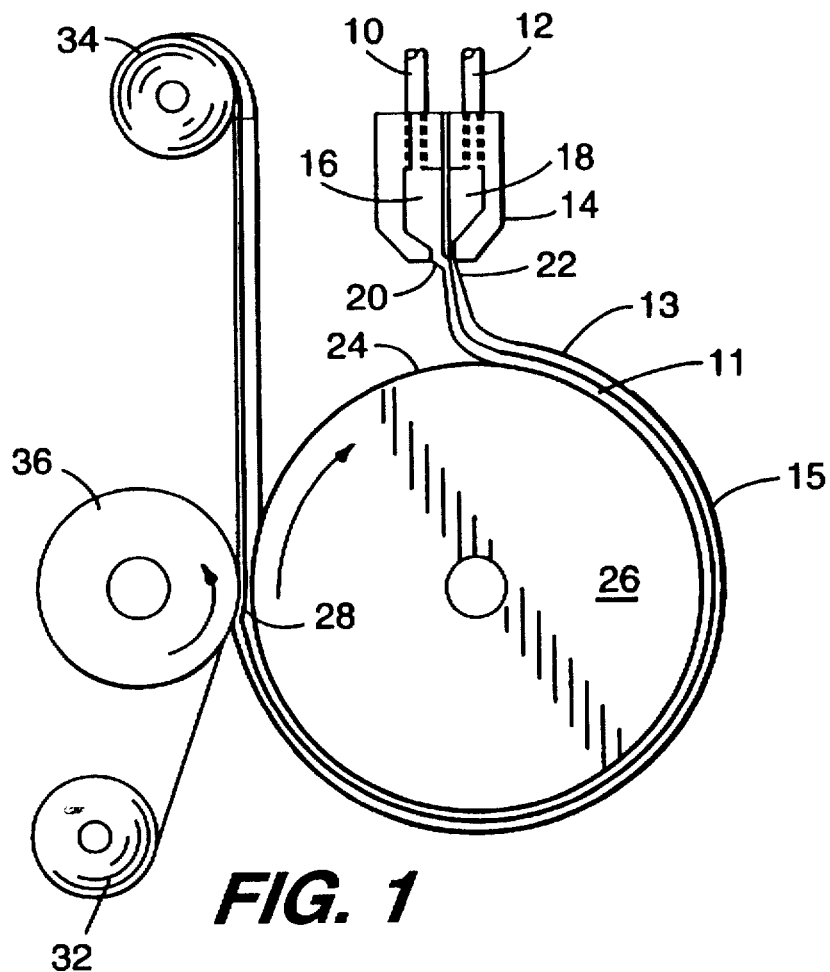
FIG. 1 is a schematic illustration of the coating method according to the present invention.

Referring now to FIG. 1, there is schematically illustrated a method according to the present invention for coating first and second layers of materials 11 and 13 onto a substrate 30.

The apparatus illustrated in FIG. 1 is adapted for applying layers of two different coating materials 11 and 13 using a manifold coating die 14, however, the method according to the present invention can also be used to apply only one or more than two layers of coating material. The coating die 14 has two separate chambers 16 and 18 which receive the coating materials 11 and 13 from sources 10 and 12, respectively, and has two elongate die outlet openings 20 and 22 communicating with the chambers 16 and 18, respectively, which are proximate the peripheral surface 24 of an application roller 26 and have their lengths generally aligned with the axis of the application roller 26.

First and second coating layers of the two coating materials 11 and 13 respectively are applied onto the periphery of the application roller 26 through the die openings 20 and 22 to form a multi layer coating 15, and are subsequently transferred from the application roller 26 to a substrate 30 at an application interface 28 while being sheared at the application interface 28 to reduce the thickness of the first and second layers of coating material compared to their thicknesses at the die openings 20 and 22.

Figure 2:
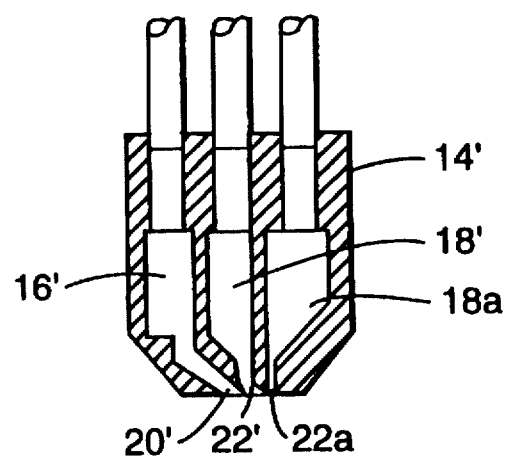
FIG. 2 is a cross-sectional view of an alternative embodiment of a die that could be used in the method according to the present invention.

The first coating material 11 is extruded through the first die opening 20 where it joins the second coating material 13 that has been extruded through the second die opening 22 to form the multiple layer coating 15. (Additional die openings may also be provided, as shown in the embodiment of a manifold die 14' in FIG. 2 which includes three chambers 16', 18', and 18a and three die openings 20', 22', and 22a). The multiple layer coating 15 is then carried on the peripheral face 24 of the application 26 roller toward the application interface 28, for transfer to the substrate 30.

The substrate 30 is withdrawn from a supply roll 32, and the coated substrate is collected by a take-up roll 34. A backing roller 36 opposes the application roller 26 at the application interface 28. When the multiple layer coating 15 reaches the application interface 28, the multiple layer coating 15 is transferred to the substrate 30. The outermost first coating layer of the coating material 13 contacts and adheres to the substrate 30 because the attractive forces between that outermost first coating layer and the substrate 30, and between the first and second coating layers of the materials 13 and 11, are greater than the attractive force between the application roller 26 and the second coating layer of the material 11. The peripheral surface of the application roller 26 may be coated with a release coating, such as Teflon, to facilitate release of the multi-layer coating material 15.

The application roller 26 can, optionally, be rotated at a surface velocity that is greater than the velocity of the coating materials 13 and 11 exiting the die openings 20 and 22. This causes drawing or stretching of the multiple layer coating 15, resulting in less thickness for the first and second coating layers of the materials 11 and 13 on the periphery of the application roller 26 than would result if the application roller 26 were rotated at the same surface velocity as the velocity of the coating materials 13 and 11 exiting the die openings 20 and 22.

The multiple layer coating 15 is tangentially sheared and thereby thinned by conveying the substrate 30 past the application roller 26 at a greater velocity than the surface velocity of the application roller 26. For example, if the substrate 30 is conveyed at a velocity of 1.0 m/s (197 ft/min.), and the peripheral surface of the application roller 26 is traveling at a velocity of 0.5 m/s (98.4 ft/min.) at the application interface 28, the draw ratio is approximately 2:1. Thus, the thickness of the multiple layer coating 15 will be approximately ½ as thick on the substrate 30 as on the peripheral surface of the application roller 26.

The velocity of the peripheral surface of the application roller 26 and the spacing along that periphery between the position of the coating die 14 and the application interface 28 are selected to provide a time interval of at least 0.12 second (and preferably of at least 0.25 second) for movement of each portion of the first and second coating layers from the coating die 14 to the application interface 28. This amount of time after the materials 11 and 13 are extruded through the outlet openings 20 and 22 and are possibly drawn or stretched between the coating die 14 and the periphery of the application roller 26 and before the multiple layer coating 15 is sheared and thinned at the application interface 28 affords some relaxation and molecular reorientation of the hot melt polymeric material 11 to at least partially remove orientations caused by that material 11 being extruded through the coating die 14, which relaxation and molecular reorientation facilitates elongation of the first coating layer 15 at the application interface 28. Without such relaxation and molecular reorientation, there is a much greater tendency for the molecular orientation in the materials 11 and 13 caused by the extrusion through the die outlet openings 20 and 22 and possible drawing at the coating die 14 to cause ribbing or breaking of the coating layer when it is sheared and thinned at the application interface 28.

Although it is preferred that the coating materials 11 and 13 meet to form the multiple layer coating 15 prior to contact with the application roller 26, the coating materials 11 and 13 could instead be sequentially applied to the application roller 26. The first coating material 11 could be extruded on or applied to the periphery of the application roller 26 to form the first coating layer, and the second coating material 13 could then be extruded on or applied over the first coating layer to form the multiple coating layer 15.

Various materials may be applied using the method described above. For example, the first material 11 (which forms the outermost layer on the substrate 30) may be a pressure sensitive adhesive comprising isooctyl acrylate (IOA), octodecyl acrylate (ODA), acrylic acid (AA), and 4-acryloyl-oxy-benzophenone (ABP). Alternatively, the first material 11 may be a pressure sensitive adhesive comprising isooctyl acrylate (IOA), octodecyl acrylate (ODA), and 4-acryloyl-oxybenzophenone (ABP). Other suitable adhesives for use as the first material 11 are disclosed in PCT Publication No. WO 93/13148 and in commonly assigned U.S. patent application Ser. No. 07/816,593, filed 31 Dec. 1991 and entitled "Removable, Low Melt Viscosity Acrylic Pressure Sensitive Adhesives," the contents of which are incorporated herein by reference.

The second material 13 could form a second coating layer called a "tie" layer that bonds an adhesive first coating layer to a paper substrate. A suitable second material 13 for use in such a tie layer comprises maleated propylene/hexene copolymer, such as that available from the Eastman Chemical Corporation of Kingsport, Tenn. under product number P1824-013.

The method and apparatus according to the present invention provide a solution to the die opening occlusion problems of the prior art described above. The present invention overcomes problems of die opening occlusion by affording the use of die openings that are sufficiently large that they will not easily be occluded. The multiple layer coating 15 can be relatively thick when it exits the extruding apparatus 14. It can, optionally, be made thinner by causing drawing or stretching at the interface between the coating die and the application roller 26, and it will be made thinner by being sheared at the interface 28 between the peripheral surface of the application roller 26 and the substrate 30. As a result, a relatively thin multiple layer coating 15 can be applied to the substrate 30, even though a relatively thick multiple layer coating 15 was initially extruded from the coating die 14. Gels and other contaminants that might become lodged in smaller die openings (such as those that might be used in direct die coating apparatuses to form a multiple layer coating 15 of the same thickness on the substrate 30) pass through the larger die openings of the present invention. Thus, the streaks and voids in the coating layer that result from occlusion of the die openings are restricted.

The manifold die 14 may be designed as known in the art, and should be adapted to facilitate the even, smooth extrusion of the respective coating materials. The geometry of the die and die openings may thus be selected for optimum performance with a particular set of coating materials. For example, the extrusion pressure may be increased or decreased, the die opening dimensions may be increased or decreased, the separation between the respective die openings may be increased or decreased, or the partition separating adjacent chambers may be raised or lowered to enable the respective layers to meet slightly inside of or outside of the die. The extrusion process thus may be optimized for the materials to be extruded, as is known in the art.

The present invention will be better understood with reference to the following Example, which is intended to be illustrative and nonlimiting.

A source of a pressure sensitive adhesive comprising 58% by weight isooctyl acrylate (IOA), 40% by weight octodecyl acrylate (ODA), 2% by weight acrylic acid (AA), and 0.4% by weight 4-acryloyl-oxy-benzophenone (ABP) was provided (the total percentage of the constituents does not equal 100% due to rounding). The adhesive was prepared in accordance with the disclosure of U.S. patent application Ser. No. 07/816,593, the disclosure of which was incorporated by reference above. The adhesive was heated to a temperature of approximately 138° C.(280° F.) prior to being supplied under pressure to the first chamber 16 of the manifold die 14. The first and second chambers 16 and 18 of the manifold die 14 each included a single, slot-shaped die opening, 20 and 22 respectively, each measuring approximately 2.9 cm (1.14 in) long by 0.051 cm (0.02 in) wide. The pressure was applied by a constant displacement gear pump, and was maintained at a level sufficient to produce a flow rate of approximately 1.42 g/s (0.050 oz/s) through the first die opening 20.

Similarly, a source of polyolefin, available from the Eastman Chemical Company of Kingsport, Tenn. under product number P1824-013, was provided, and was heated prior to being supplied under pressure to the second chamber 18 of the manifold die 14. The pressure was applied by a second constant displacement gear pump, and was maintained at a level sufficient to produce a flow rate of approximately 0.675 g/s (0.0238 oz/s) through the second die opening 22. The second die opening 22 measured approximately 3.175 cm (1.25 in) long by 0.0254 cm (0.01 in) wide. A partition separated the first and second chambers 16 and 18 of the die 14 to prevent mixing of the respective coating materials 11 and 13.

The first die opening 20 was upstream of the second die opening 22 to enable the respective coating materials 11 and 13 to be extruded through the respective die openings 20 and 22, and to meet to form the multiple layer coating 15. The application roller 26 was supported for rotation about its axis adjacent the die openings 20 and 22, such that the multiple layer coating 15 would collect on the peripheral surface of the application roller 26. The application roller 26 had a radius of approximately 12.7 cm (5.0 in), and a peripheral surface width of 3.175 cm (1.25 in). The peripheral surface of the application roller 26 included a multiplicity of projecting structures randomly distributed across the peripheral face of the application roller 26, which structures measured approximately 0.76 mm (0.003 in) high, and were generally hemispherical. The projecting structures provided a discontinuous surface texture for the surface of the first layer of pressure sensitive adhesive material 11 that contacted it. The peripheral surface of the application roller 26 was coated with a fluorocarbon or Teflon release coating to facilitate transfer of the multiple layer coating 15 to the substrate at the application interface. Further background information regarding the construction and operation of the application roller 26 apparatus may be found in copending U.S. patent application Ser. No. 08/056,362, filed 30 Apr. 1993 and entitled "Method and Apparatus for Applying a Coating Material to a Substrate," commonly assigned to the assignee of the present application, the contents of which are incorporated herein by reference.

The application roller 26 was rotated about its central axis at a rotational velocity sufficient to produce a velocity of 0.5 m/s (19.68 in/s or 100 ft/min.) at its peripheral surface. The first and second gear pumps were activated to extrude the first and second coating materials 11 and 13 through the first and second die openings 20 and 22, respectively. The extruded layers of coating materials 11 and 13 bonded together to form the multiple layer coating 15, but little or no mixing occurred between the respective layers. The first layer of pressure sensitive adhesive material 11 was approximately 0.003 cm (0.0012 in) thick, and the second layer of tie material 13 was approximately 0.001 cm (0.0004 in) thick.

A substrate 30 or supply web of 20 pound xerographic bond paper was provided, and the paper from the supply roller 36 was conveyed tangentially past the periphery of the application roller 26 at the application interface 28 and collected on a take-up roller 34. The paper measured 30.5 cm (12.0 in) wide and 0.0122 cm (0.0048 in) thick. The substrate 30 or paper web was conveyed at a velocity of 1.5 m/s (300 ft/min.) at the application interface 28, and thus the web velocity was greater than the surface velocity of the periphery of the application roller 26 by approximately a factor of 3.

The multiple layer coating 15 was transferred to the substrate 30 or paper web at the application interface 28. The second or tie layer of material 13 adhered to the paper web, and the first layer of adhesive coating material 11 released from the peripheral surface of the application roller 26. The resulting coated layer thicknesses on the paper web 30 were 0.0102 mm (0.0004 in) for the first layer of adhesive material 11, and 0.0033 mm (0.00013 in) for the second layer of tie material 13. The first layer of adhesive material 11 was exposed along the paper substrate 30, and the adhesive coated paper web was adapted for adhesive engagement with a surface.

The distance along the peripheral surface of the application roller 26 between the die openings 20 and 22 and the application interface 28 was about 0.30 meters (11.76 inches) so that parts of the multiple layer coating 15 took about 0.6 second to move from the die openings 20 and 22 to the application interface. No tendency was observed for the first layer of adhesive material 11 or the second layer of tie material 13 to either break or form longitudinal ribs.

It should be understood that although the present invention has been described with reference to the transfer of a multiple layer coating directly to a substrate, it is within the scope of the present invention to transfer the multiple layer coating to one or more intermediate rollers or other apparatuses, and then to a substrate. That is, the transfer of the multiple layer coating from the application roller to the substrate is preferably a direct transfer, but may instead be an indirect transfer if desired.

The present invention has now been described with reference to several embodiments thereof However, persons of skill in the art will recognize that variations may be made in the embodiments described without departing from the scope of the invention. Thus, the scope of the present invention should not be limited by the embodiments shown and described herein, but rather by the structures described by the claims, and the equivalents of those structures.

We claim:

1. A method of applying a coating of hot melt polymeric material to a substrate, said method comprising the steps of:
   providing a coating apparatus including an application roller having a cylindrical peripheral surface about an axis, means mounting the application roller for rotation about the axis, die means having a first elongate die outlet opening, and means for mounting the die means at a die position along the cylindrical peripheral surface of the application roller with the die opening extending generally parallel to the axis of the application roller;
   rotating the application roller about the axis to provide a first velocity and direction of movement for the peripheral surface of the application roller and movement of the peripheral surface of the application roller past the die opening;

extruding a hot melt polymeric material through the first die opening onto the peripheral surface of the rotating application roller to provide a first coating layer along the peripheral surface with a first surface of the first coating layer in contact with the peripheral surface of the rotating application roller;

conveying the substrate past the peripheral surface of the application roller at an application interface with generally the same direction of movement as the periphery of the application roller to cause transfer of the first coating layer to the substrate at the application interface with the first surface of the first coating layer on the side of the first coating layer opposite the substrate, the substrate being conveyed at a velocity greater than the peripheral surface velocity of the application roller to shear and reduce the thickness of the first coating layer on the substrate with respect to the thickness of the first coating layer on the peripheral surface of the application roller;

the velocity of the peripheral surface and spacing between the die position and the application interface along that peripheral surface providing a time interval of at least 0.12 second for movement of portions of the first coating layer from the die position to the application interface to afford relaxation and molecular reorientation of the hot melt polymeric material after said extruding step to facilitate shearing of the first coating layer at the application interface.

2. A method according to claim 1 wherein said die means has a second elongate die outlet opening along the cylindrical peripheral surface of the application roller and extending generally parallel to the axis of the application roller on the side of the first die outlet opening toward which the peripheral surface of the application roller is rotated; and the method further includes the step of extruding through the second die opening onto the first coating layer along the peripheral surface a second coating layer of material adapted to help attach the first coating layer to the substrate.

3. A method according to claim 1, wherein the velocity of the peripheral surface and the spacing between the die position and the application interface provide a time interval of at least 0.25 second for movement of portions of the first coated layer from the die position to the application interface.

4. A method according to claim 1, wherein the hot melt polymeric material is a pressure sensitive adhesive.

5. A method according to claim 1, wherein in said conveying step the substrate is conveyed tangentially past the cylindrical peripheral surface of the application roller at the application interface.

6. A method according to claim 1, wherein the application roller is rotated with a velocity of said cylindrical peripheral surface that is greater than the velocity of the polymeric material exiting the first die outlet opening to stretch the polymeric material and provide a thickness for the first coating layer that is less than the thickness of the hot melt polymeric material as it leaves the first die outlet opening.

7. A method according to claim 1, wherein the peripheral surface of said application roller is partially defined by projecting structures adapted to cause a desired surface texture along the first surface of the first coating layer.

\* \* \* \* \*